United States Patent [19]

Payne

[11] Patent Number: 4,478,742
[45] Date of Patent: Oct. 23, 1984

[54] PREPARATION OF A FERRIC ACETATE COATED SILICA SOL BY SELECTIVE ANION EXCHANGE

[75] Inventor: Charles C. Payne, Aurora, Ill.

[73] Assignee: Nalco Chemical Company, Oak Brook, Ill.

[21] Appl. No.: 493,396

[22] Filed: May 10, 1983

Related U.S. Application Data

[63] Continuation-in-part of Ser. No. 301,508, Sep. 14, 1981, abandoned.

[51] Int. Cl.$^3$ ............... B01J 13/00; C04B 35/00; C09C 1/22
[52] U.S. Cl. .................. 252/313 2; 252/62.51; 106/304
[58] Field of Search ............... 252/313 S, 62.51 C, 252/62.51 R; 106/304

[56] References Cited

U.S. PATENT DOCUMENTS

| 4,252,671 | 2/1981 | Smith | 252/430 |
| 4,370,279 | 1/1983 | Sasaki | 260/465.3 |
| 4,401,636 | 8/1983 | Flowers | 423/327 |

Primary Examiner—Richard D. Lovering
Assistant Examiner—Catherine S. Kilby
Attorney, Agent, or Firm—John G. Premo; Robert A. Miller; Donald G. Epple

[57] ABSTRACT

A method of producing iron acetate coated silica sol which comprises the steps of passing a mixture of ion-free colloidal silica and an inorganic iron salt in contact with a strong base anion exchange resin in the acetic acid salt form under conditions whereby the iron salt is converted to the iron acetate and is coated on the silica sol, thereby producing an iron acetate coated silica sol.

2 Claims, No Drawings

PREPARATION OF A FERRIC ACETATE COATED SILICA SOL BY SELECTIVE ANION EXCHANGE

This is a continuation-in-part of application, Ser. No. 301,508, filed Sept. 14, 1981, now abandoned,

INTRODUCTION

Metal acetate coated sols involve easy laboratory preps in which the final product will act similar to a metal oxide coated sol (normally a difficult lab prep). But, for example, ferric acetate, the starting material for making the ferric acetate coated silica sol, cannot be obtained commercially in large quantities and at a reasonable cost.

THE INVENTION

To solve this problem, the acetate coated silica sols can be made using an anion exchange method by relying on the preferential selection of one anion over another by the resin. The process is as follows: a method of producing iron acetate coated silica sol which comprises the steps of passing a mixture of ion-free colloidal silica and an inorganic iron salt in contact with a strong base anion exchange resin in the acetic acid salt form under conditions whereby the iron salt is converted to the iron acetate and is coated on the silica sol, thereby producing an iron acetate coated silica sol.

The Starting Ion-Free Silica Sols

These materials are available commercially. A method for their preparation is described in U.S. Pat. No. 3,342,747, the disclosure of which is incorporated herein by reference.

A convenient starting ion-free sol for use in practicing the invention is the product, NALCOAG[1] 1034-A. Typical specifications of this material are set forth below:

| | |
|---|---|
| Colloidal Silica, as $SiO_2$ | 34% |
| pH | 3.1 ± 0.5 |
| Average Particle Size | 16.22 mμ |
| Average Surface Area | 135–190 $M^2$/gram |
| Specific Gravity at 68° F. | 1.230 |
| Viscosity at 77° F. | <20 cp |
| $Na_2O$ | <0.05% |

[1] Registered Trademark, Nalco Chemical Company.

The concentration of the starting salt-free silica sol may be as little as 5% silica as $SiO_2$ or it may be higher, e.g. 25–40% by weight $SiO_2$. NALCOAG 1034A may be used as such as the starting silica sol.

The Starting Iron Salts

The preferred starting salts are ferric inorganic salts, particularly the ferric salts of the mineral acids such as ferric chloride, sulfate, or nitrate. Of these, ferric sulfate is a preferred species.

The Strong Base Anion Exchange Resins

Examples of these materials include the commercially available Nalcite SBR, Dowex 1, Dowex 2, Dowex 11, and Dowex 21K. Nalcite SBR and Dowex 1 and 2 are described in U.S. Pat. No. 2,591,573. Each of the above exchange resins has a quaternary ammonium type of exchange group. The quaternary ammonium anion exchange resins are highly ionized and can be used over the entire pH range. They are capable of salt-splitting reactions which convert a neutral salt to its corresponding base.

The properties of the resin are described by Kunin and Meyers in the *Journal of the American Chemical Society*, volume 69, p. 2874, for 1947.

Illustration of the Invention

Prepare the acetate form of Dowex SBR ion exchange resin by regenerating Dowex SBR - OH form resin with acetic acid. A fully regenerated resin requires about 25 pounds of 100% acetic acid per cubic foot of resin. The excess regenerant is washed from the column until the effluent pH is about 4. Excess washing will cause extensive hydrolysis of the resin back to the hydroxide form.

A mixture of ferric sulfate and NALCOAG 1034A is then prepared as follows:

| | |
|---|---|
| To | 50 g NALCO 1034A |
| Add | 6 g $Fe_2(SO_4)_3 \cdot xH_2O$ |
| Add | 1 g conc. acetic acid |

The mixture was passed through the column at a flow rate of about 2 gpm/cu. ft. The final product had the following specs:

| | |
|---|---|
| Solids | = 31.4% |
| pH | = 2.1% |
| Cond. | = 3700 μmhos |

The ion exchange resin was washed with water and then sulfuric acid. There was no visible appearance of iron fouling of the resin.

The coated sols or the invention are capable of being used in many of the industrial applications for which iron sols are suitable. They are particularly useful as ingredients in magnetic recording tapes of all kinds. The various uses described in U.S. 3,139,406 and 4,252,671 for the sol products therein disclosed can utilize the coated sols of the invention.

Having thus described my invention, it is claimed as follows:

1. A method of producing iron acetate coated silica sol which comprises the steps of passing a mixture of ion-free colloidal silica and an inorganic iron salt in contact with a strong base anion exchange resin in the acetic acid salt form under conditions whereby the iron salt is converted to the iron acetate and is coated on the silica sol, thereby producing an iron acetate coated silica sol.

2. The method of claim 1 where the iron salt is ferric sulfate.

* * * * *